US006526332B2

(12) United States Patent
Sakamoto et al.

(10) Patent No.: US 6,526,332 B2
(45) Date of Patent: Feb. 25, 2003

(54) ROBOT CONTROL SYSTEM AND METHOD FOR INTRODUCING ROBOT CONTROL SOFTWARE

(75) Inventors: Takayuki Sakamoto, Kanagawa (JP); Kazufumi Oyama, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/171,561

(22) Filed: Jun. 10, 2002

(65) Prior Publication Data

US 2002/0173879 A1 Nov. 21, 2002

Related U.S. Application Data

(63) Continuation of application No. PCT/JP01/08845, filed on Oct. 9, 2001.

(30) Foreign Application Priority Data

Oct. 11, 2000 (JP) ........................................ 2000-310146

(51) Int. Cl.[7] .............................................. G05B 15/00
(52) U.S. Cl. ........................ 700/259; 700/245; 700/257; 700/264; 318/468; 707/100; 707/500; 707/501.1
(58) Field of Search .......................... 700/245, 259, 700/122, 100, 101, 102, 200, 201, 203, 257, 264, 216; 318/468; 707/100, 500, 501.1

(56) References Cited

U.S. PATENT DOCUMENTS

| | | | | |
|---|---|---|---|---|
| 5,276,881 A | * | 1/1994 | Chan et al. | 198/394 |
| 5,280,613 A | * | 1/1994 | Chan et al. | 198/394 |
| 5,579,444 A | * | 11/1996 | Dalziel et al. | 198/380 |
| 6,292,714 B1 | * | 9/2001 | Okabayashi | 198/380 |
| 6,321,140 B1 | * | 11/2001 | Fujita et al. | 700/248 |
| 6,351,706 B1 | * | 2/2002 | Morimoto et al. | 701/208 |
| 6,411,055 B1 | * | 6/2002 | Fujita et al. | 318/568.11 |
| 6,430,471 B1 | * | 8/2002 | Kintou et al. | 180/169 |

FOREIGN PATENT DOCUMENTS

| | | |
|---|---|---|
| EP | 855335 | 7/1998 |
| JP | 11-58280 | 3/1999 |
| JP | 2000-210886 | 8/2000 |
| JP | 2000-267852 | 9/2000 |

OTHER PUBLICATIONS

Stewart et al., Integrateion of reall–time software modules for reconfigurable sensor–based control system, 1993, Internet, pp. 1–10.*
MacKenzie, et al., Evaluating the usability of robot programming toolsets, 1998, Internet, pp. 1–33.*
Jarvis et al., Implementing a multi–agent systems approach to collaborative autonomous manufacturing operations, 2001, Internet, pp. 1–13.*
Natali et al., Exploiting logic programming in robot application, no date, Internet, pp. 1–1–14.*

* cited by examiner

Primary Examiner—William A. Cuchlinski, Jr.
Assistant Examiner—McDieunel Marc
(74) Attorney, Agent, or Firm—Frommer Lawrence & Haug LLP; William S. Frommer

(57) ABSTRACT

An articulated robot is controlled by dynamically modifying a combination of a hardware dependent middleware layer and a hardware independent application layer. A memory device for storing a plurality of sets of robot hardware dependent software programs and a memory device for storing a plurality of sets of robot hardware independent software programs are prepared. During execution of software programs, a software program compatible with a robot hardware configuration is introduced from the former memory device, and this software program is dynamically combined with the set of hardware independent software programs. The robot is thus appropriately controlled, meeting the needs of users.

12 Claims, 10 Drawing Sheets

FIG. 1
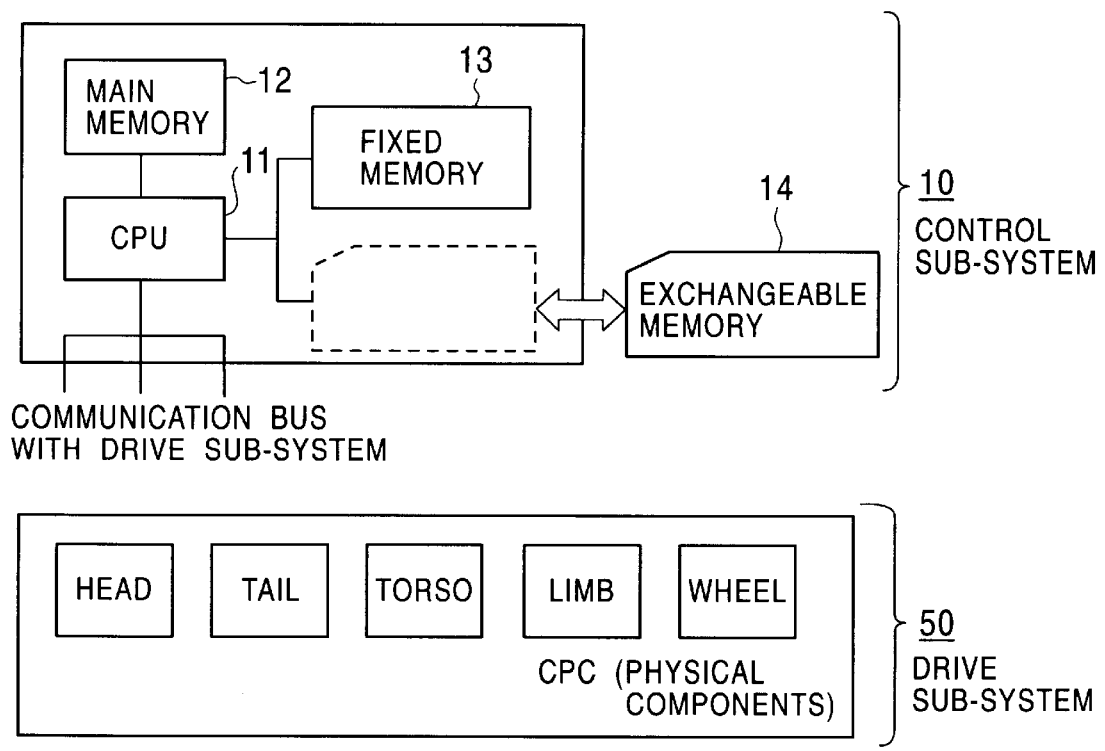
FIG. 2
(a)
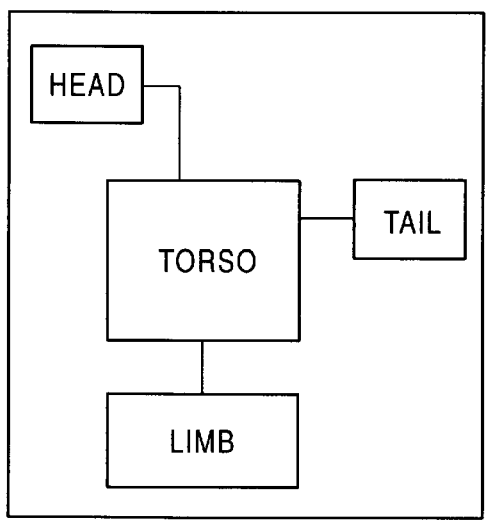
(b)
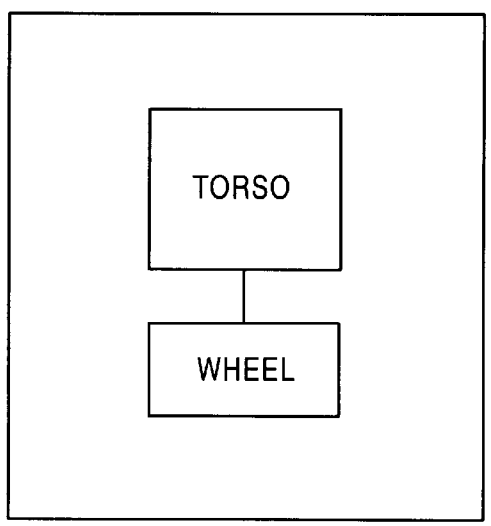

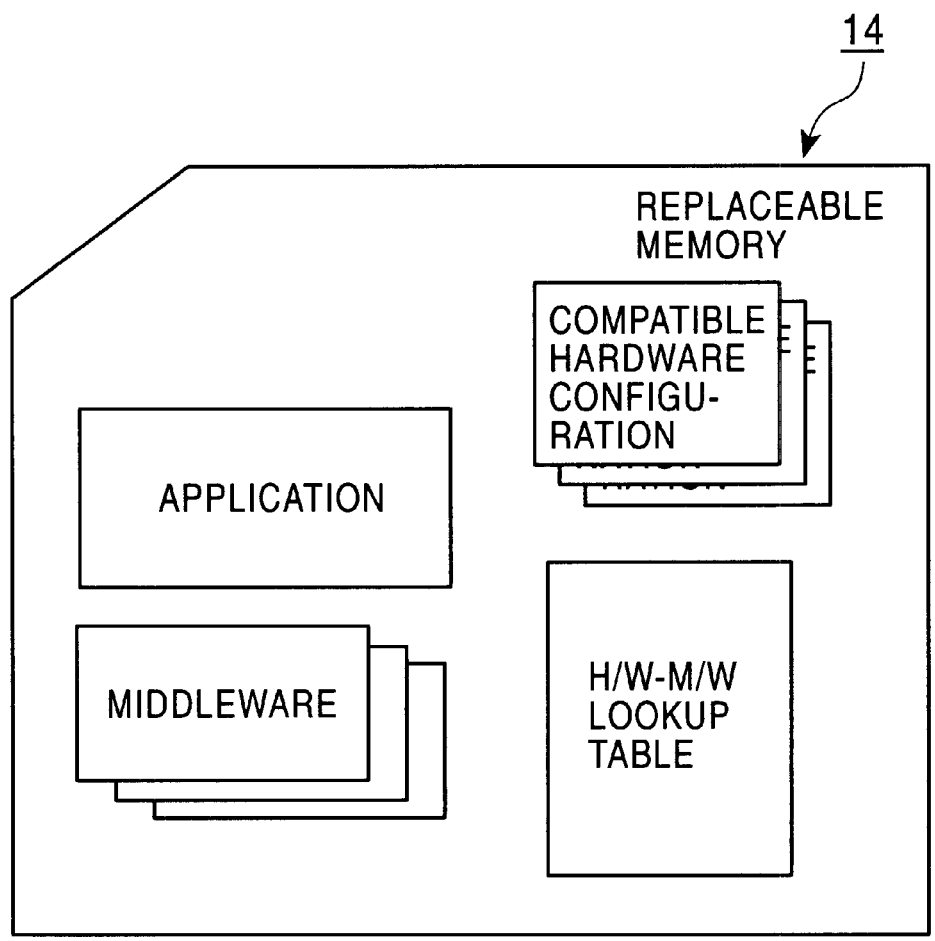

FIG. 8

BEST MATCH OPERATION MODE

| APPLICATION (INTRODUCED FROM REPLACEABLE MEMORY) | MIDDLEWARE (INTRODUCED FROM REPLACEABLE MEMORY) | SYSTEM |
|---|---|---|

INTERCHANGEABLE OPERATION MODE

| APPLICATION (INTRODUCED FROM REPLACEABLE MEMORY) | MIDDLEWARE (INTRODUCED FROM FIXED MEMORY) | SYSTEM |
|---|---|---|

FIXED OPERATION MODE

| APPLICATION (INTRODUCED FROM FIXED MEMORY) | MIDDLEWARE (INTRODUCED FROM FIXED MEMORY) | SYSTEM |
|---|---|---|

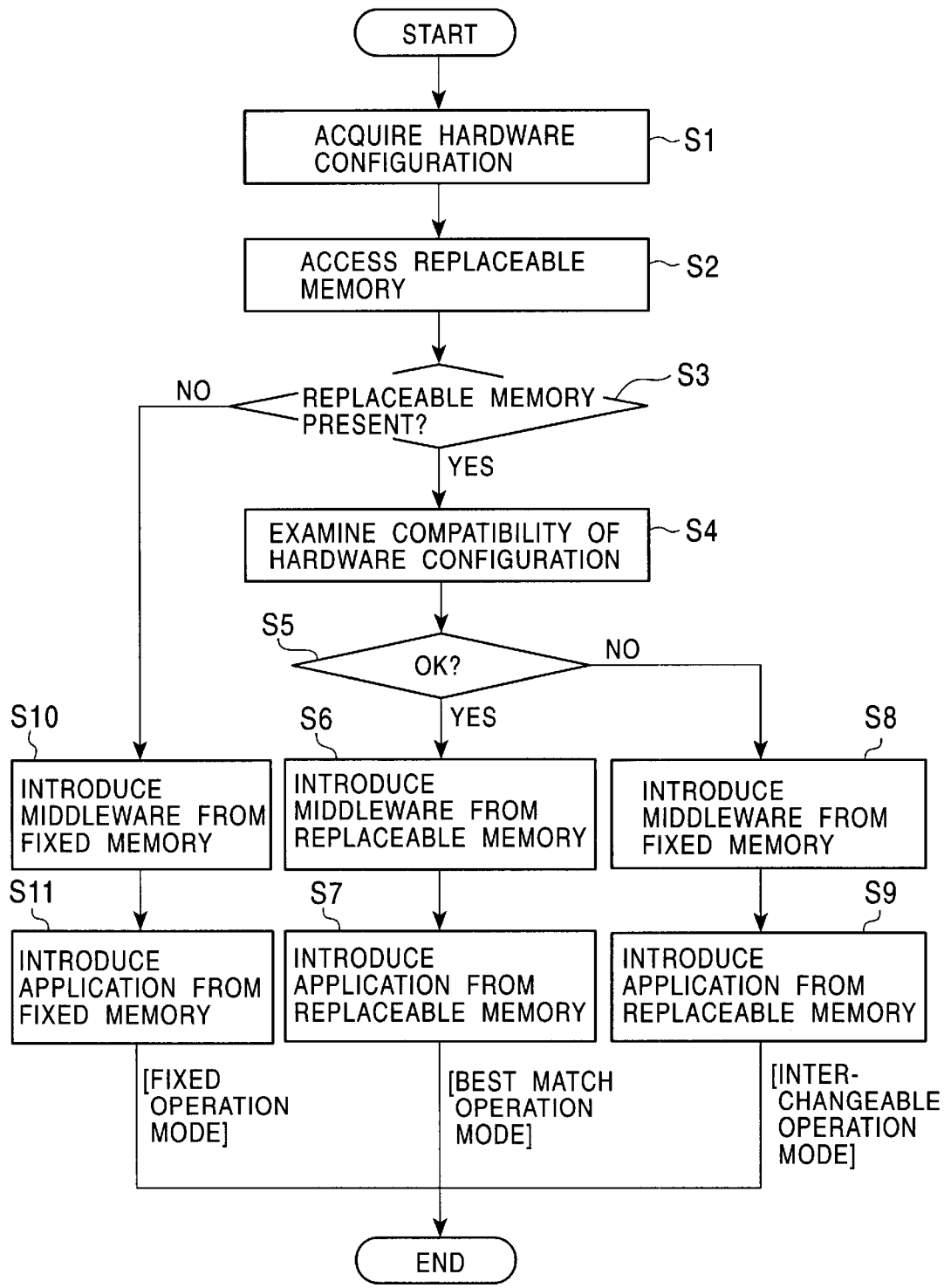

ROBOT CONTROL SYSTEM AND METHOD FOR INTRODUCING ROBOT CONTROL SOFTWARE

This is a continuation of copending International Application PCT/JP01/08845 having an international filing date of Oct. 9, 2001.

TECHNICAL FIELD

The present invention relates to a robot control system which controls an articulated robot such as a legged walking type robot using a software program, and relates a method of introducing a robot control software program. Particularly, the present invention relates to a robot control system which controls, using a software program, an articulated robot which can substantially modify a hardware configuration when an operation unit such as a head unit or a limb unit is mounted, demounted, or interchanged, and relates to a method of introducing a robot control software program. More particularly, the present invention relates to a robot control system which controls an articulated robot using a software program formed of a combination of a software layer largely dependent on a hardware configuration and a software layer independent of the hardware configuration, and relates to a method of introducing a robot control software program. The present invention also relates to a robot control system which controls an articulated robot by dynamically modifying a combination of a hardware dependent software layer such as a middleware and a hardware independent software layer such as an application, and relates to a method of introducing a robot control software.

BACKGROUND ART

A machine that moves by means of electrical or magnetic effects mimicking the behavior of a human is called a "robot." The term robot is said to be derived from Slavic word Robota (slave machine). In Japan, robots started to be widely used from the 1960s, and most of the robots were then industrial robots such as manipulators and conveyance robots for automating a production line in a plant or for use in an unmanned plant.

Research and development have advanced in moving legged walking robots that use feet in walking and stable walk control for the moving robots, such as pet-type or toy robots which imitate the living mechanisms and the behavior of quarupedalling animals such as the dog and the cat, and "human-like figured" or "human-type" robots (humanoid robots) which imitate the living mechanism and the behavior of human beings or apes. Expectations of commercializing these robots are currently mounting. The legged walking robot is unstable and presents more difficulty in posture control and walking control than crawling robots. However, the legged walking robot is excellent in that the legged walking robot is flexible in walking and running, for instance, going up and down the stairs, and striding over an obstacle.

An installed robot, such as a robot arm, which is firmly planted at a particular location, is used for the assembling and selection of parts in a limited and local work space only. In contrast, the work space of the moving robot is not limited. The moving robot moves along a predetermined track or freely on a non-tracked area, performing any or predetermined job conventionally manually done by humans. The moving robot thus provides various services, instead of the human beings, the dogs, and other living things.

One of the applications of the legged walking robots is a diversity of risky and difficult jobs in industrial and production activities. For instance, in place of human beings, the legged walking robots are expected to perform risky and difficult jobs such as maintenance work in nuclear power plants, thermoelectric power plants, and petrochemical plants, conveyance and assembly operation of parts in production plants, cleaning operations on high-rise buildings, and rescue activities in the site of a fire.

Besides the above job assisting applications, the legged walking robots may perform a job which may be closely related to the living environments of human beings, namely, "synergistic application" or "entertainment" applications. This type of robots emulates the behavior of human beings or a variety of expressions of legged animals having a relatively high intelligence, such as dogs (pets), using the four legs. The robot not only performs faithfully an operation pattern input beforehand, but also dynamically responds to words and actions of a user (or another robot) (such as "praising", "chastising", or "beating"). The robot is thus required to vividly respond to these actions and express their emotions.

Conventional toy machines offer fixed interactive relationship with a user operation, and cannot be modified according to the user's preference. As a result, the user may grow tired of the toy that simply repeats the same operation.

In contrast, intelligent robots have a behavior model and a learning model which responds to a stimulation, and thinks in a self-determining manner and performs operation control by determining a behavior by changing the model in response to information input from outside, such as a voice, an image, and tactile sensation. The robot, having an emotion model and an instinct model, behaves in a self-determining manner based on the emotion and the instinct of the robot itself. With an image input device and a voice input and output device, the robot performs an image recognition process and a voice recognition process. The robot thus communicates with humans in a realistic manner at a highly intelligent level.

The legged walking robots currently have an excellent information processing capability, and such intelligent robots may be regarded as one type of computation system.

The robots have a diversity of rules about action in the forms of an emotion model, a behavior model, and a learning model. The robot then determines a behavior plan in response to an external stimulation such as a user action in accordance with these models, and carries out the behavior plan through driving a joint actuator or voice output, thereby giving a feedback to the user. The operation control of the robot to determine and carry out the behavior plan is performed by executing a program code (such as an application) on a computation system.

As for the main difference between an ordinary computation system and a robot, the computation systems are not so different in the type and combination of hardware components (namely, a hardware configuration) forming the system from system to system. The robots are significantly different in hardware configuration from robot to robot. For example, there is a diversity of legged walking robots. One robot includes a torso unit, and as movable units, a head unit, limb units, and a tail unit which are fixed to the torso unit. Another robot may be formed of a head unit and wheels only.

In the computation systems which are relatively standardized in the installed hardware configuration from system to system, design of software program executed on the system is less subject to the system hardware. In contrast, in the robot, the control software for operating the hardware is much more dependent on the hardware.

Now, moving control of a robot is considered. During movement and walking, stability determination criteria are totally different between when movement means is moving feet and when the movement means is a wheel, or between when the movement means is bipedaling and when the movement means is quadrupedaling, and thus, operation environments under which an application is performed are different from system to system.

In view of the above point, if the software layer less dependent on hardware is discriminated from the software layer more dependent on hardware, the software of the robot is efficiently developed. Specifically, hardware independent software and hardware dependent software are individually developed, and a product lineup having a diversity of characteristics and performance levels is provided by combining both types of software.

The hardware independent software includes applications that perform processes such as those for the emotion model, the behavior model, and the learning model, which are loosely related to hardware operation. The hardware dependent software is a middleware composed of a group of software modules for providing a basic function of the robot. The construction of each module is dependent on hardware attributes such as electromechanical characteristics and specifications of the robot. From the standpoint of function, middlewares may be mainly divided into recognition middlewares which process and recognize a signal input to each sensor and reports this signal to a hierarchically higher application, and output middlewares which control and drive hardware, such as each joint actuator, in response to a command issued by the application.

To permit any combination of applications and middlewares, a format according to which data and commands are exchanged between software layers needs to be established, in other words, an interface between programs needs to be established.

To introduce a software program into a variety of computation systems including robots, a new software program may be fed in a removable medium, or may be fed by downloading the software program through a network.

When a new software program is introduced into robots which are substantially different in hardware configuration from one to another, it is important that the introduced software be compatible with a target hardware configuration. Furthermore, it is necessary to assure that the newly introduced software is compatible with other software layer (in other words, a compatibility between an application and a middleware needs to be assured).

DISCLOSURE OF THE INVENTION

It is an object of the present invention to provide an excellent robot control system which controls an articulated robot, such as a legged walking type, using a software program, and to provide a method of introducing a robot control software program.

It is another object of the present invention to provide an excellent robot control system which controls, using a software program, an articulated robot which can substantially modify a hardware configuration when an operation unit such as a head unit or a limb unit is mounted, demounted, or interchanged, and to provide a method of introducing a robot control software program.

It is yet another object of the present invention to provide an excellent robot control system which controls an articulated robot using a software program formed of a combination of a software layer largely dependent on a hardware configuration and a software layer independent of the hardware configuration, and to provide a method of introducing a robot control software program.

It is still another object of the present invention to provide a robot control system which controls the articulated robot by dynamically modifying a combination of a hardware dependent software layer such as a middleware and a hardware independent software layer such as an application, and to provide a method of introducing a robot control software.

The present invention has been developed in view of the above objects, and in one aspect relates to a robot control system which controls a robot including a combination of a plurality of hardware elements using a hardware dependent software program and a hardware independent software program. The robot control system includes hardware independent software program providing means for providing the hardware independent software program, hardware dependent software program providing means for providing at least one hardware dependent software program, hardware configuration information acquisition means for acquiring hardware configuration information of the robot, hardware dependent software program selection means for selecting a hardware dependent software program, compatible with the hardware configuration information acquired by the hardware configuration information acquisition means, in the hardware dependent software providing means, and software introduction means for introducing, into the system, the hardware independent software program provided by the hardware independent software program providing means, and the hardware dependent software program selected by the hardware dependent software selection means.

The term "system" here refers to a set of devices (or functional modules for carrying out a particular function) which is logically combined, and whether the devices or the function modules are housed in a single casing is not important.

In accordance with the robot control system of the first aspect of the present invention, the hardware dependent software providing means, namely, a memory device for storing a plurality of sets of robot hardware dependent software programs and the hardware independent software providing means, namely, a memory device for storing a plurality of sets of robot hardware independent software programs are prepared. At the startup of the robot and during the execution of software programs, a software program compatible with a robot hardware configuration is introduced from the former memory device, and this software program is dynamically combined with the set of hardware independent software programs. The robot is thus appropriately controlled, satisfying the needs of users.

The hardware independent software program and/or the hardware dependent software program is provided by the memory device which is permanently fixed to the body of the robot and the memory device which is replaceably mounted to the body of the robot.

A new software program and a software program satisfying the needs of the user may be fed to the body of the robot using the exchangeable memory device detachable from the robot body. The software introduction means controls the robot by using control software appropriately satisfying the needs of the user by introducing the hardware independent software and/or the hardware dependent software from the exchangeable memory device with priority placed thereon.

The software introduction means introduces the hardware independent software program and/or the hardware dependent software program from the fixed memory device when a usable hardware independent software program and/or a usable hardware dependent software program is not present in the exchangeable memory device or when the exchangeable memory device is not loaded.

The present invention in a second aspect relates to a robot control software program introducing method for introducing a hardware dependent software program and a hardware independent software program into a robot including a combination of a plurality of hardware configuration elements, and includes a hardware independent software program providing step for providing the hardware independent software program, a hardware dependent software program providing step for providing at least one hardware dependent software program, a hardware configuration information acquisition step for acquiring hardware configuration information of the robot, a hardware dependent software program selection step for selecting a hardware dependent software program, compatible with the hardware configuration information acquired in the hardware configuration information acquisition step, and provided in the hardware dependent software providing step, and a software introduction step for introducing, into a system, the hardware independent software program provided in the hardware independent software program providing step, and the hardware dependent software program selected in the hardware dependent software selection step.

In accordance with the robot control system of the second aspect of the present invention, a memory device for storing a plurality of sets of robot hardware dependent software programs and a memory device for storing a plurality of sets of robot hardware independent software programs are prepared. At the startup of the robot and during the execution of software programs, a software program compatible with the robot hardware configuration is introduced from the former memory device, and this software program is dynamically combined with the set of hardware independent software programs. The robot is thus appropriately controlled, thus satisfying the needs of users.

The hardware independent software program and/or the hardware dependent software program is provided by the memory device which is permanently fixed to the body of the robot and the memory device which is replaceably mounted to the body of the robot.

A new software program and a software program satisfying the needs of the user may be fed to the body of the robot using the exchangeable memory device detachable from the robot body. In the software introduction step, operation control of the robot is performed by using control software appropriately satisfying the needs of the user by introducing the hardware independent software and/or the hardware dependent software from the exchangeable memory device with priority placed thereon.

In the software introduction step, the hardware independent software program and/or the hardware dependent software program is introduced from the fixed memory device when a usable hardware independent software program and/or a usable hardware dependent software program is not present in the exchangeable memory device or when the exchangeable memory device is not loaded.

The present invention in a third aspect relates to a robot control system which controls a robot including a combination of a plurality of hardware elements using a hardware dependent software program and a hardware independent software program, wherein the hardware independent software program and/or the hardware dependent software program is provided by a memory device which is permanently fixed to the body of the robot and a memory device which is replaceably mounted to the body of the robot, wherein the robot control system controls the robot in one of a best match operation mode, an intercompatible operation mode, and a fixed operation mode, and wherein in the best match operation mode, the robot is controlled using the hardware dependent software program and the hardware independent software program introduced from the exchangeable memory, in the intercompatible operation mode, the robot is controlled using the hardware dependent software program introduced from the fixed memory device and the hardware independent software program introduced from the exchangeable memory device, and in the fixed operation mode, the robot is controlled using the hardware dependent software program and the hardware independent software program introduced from the fixed memory device.

A new software program and a software program satisfying the needs of the user may be fed to the body of the robot using the exchangeable memory device detachable from the robot body. The operation control of the robot is performed using control software appropriately satisfying the needs of the user by selecting the best match operation mode, the intercompatible operation mode, and the fixed operation mode in that order of priority.

Other objects, features, and advantages of the present invention become obvious from the following detailed description of the embodiments of the present invention, and the accompanying drawings.

BRIEF DESCRIPTION OF THE DRAWINGS

FIG. 1 diagrammatically illustrates the hardware configuration of the robot in accordance with one embodiment of the present invention.

FIG. 2 illustrates a drive sub-unit 50, the configuration of which is modified by mounting, demounting, and interchanging CPC components.

FIG. 7 illustrates a modification of the software configuration provided by the exchangeable memory device 14 illustrated in FIG. 6.

FIG. 8 illustrates operation modes of a robot of this embodiment.

FIG. 9 is a flow diagram illustrating a process sequence for introducing a middleware and an application.

BEST MODE FOR CARRYING OUT THE INVENTION

Figure 3:
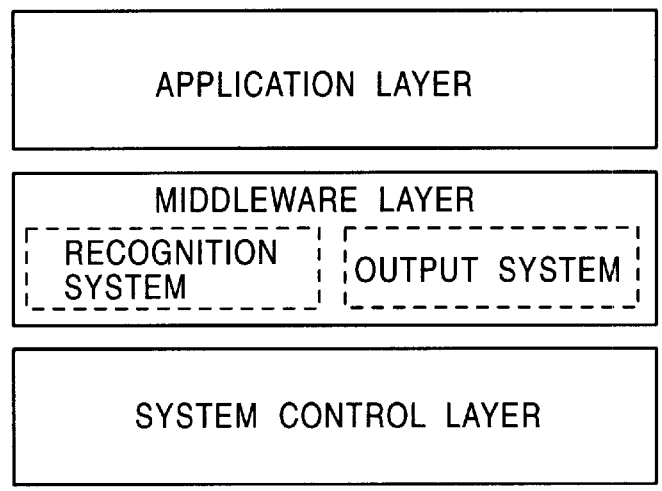
FIG. 3 is a diagram explaining the software configuration for robot control.

The embodiments of the present invention are now discussed in detail referring to the drawings.

FIG. 1 diagrammatically illustrates the hardware configuration of a robot in accordance with one embodiment of the present invention. As shown, the hardware of the robot includes a control sub-system 10 and a drive sub-system 50.

The control sub-system 10 includes a CPU (Central Processing Unit) 11, a main memory 12, a fixed memory device 13, and an exchangeable memory device 14.

Under the control of a system control software, the CPU11 as a main controller executes a hardware independent software program such as an application and a hardware dependent software program such as a middleware, thereby generally controlling the operation of the entire robot.

The CPU11 is connected to memories and other circuit components, and peripheral devices through a bus. Each device over the bus is assigned a unique address (a memory address or an I/O address), and the CPU11 communicates with a particular device by designating its address. The bus is a general signal transmission line including an address bus, a data bus, and a control bus.

The main memory 12, typically a volatile memory formed of a plurality of DRAMs (Dynamic Random Access Memory) chips, stores execution program codes for the CPU11 and temporarily stores job data. In this embodiment, program codes such as the application and the middleware supplied from the fixed memory device 13 and the exchangeable memory device 14 are developed, namely, mapped in a memory space in the main memory 12.

The fixed memory device 13 is a non-exchangeable non-volatile memory fixed to the body of the robot. The fixed memory device 13 may be formed of a non-volatile memory element, which is programmed by applying a write voltage, such as a flash memory.

The fixed memory device 13 is used to store program codes of an application for controlling the operation and thinking of the robot and a middleware for hardware operation. Since the fixed memory device 13 is fixed to the robot, the hardware dependent software such as the middleware is preferably prepared with the version thereof set to be compatible with the hardware configuration at the shipment of the robot (default setting) or a standard hardware configuration.

The exchangeable memory device 14 is a non-volatile memory that is detachably mounted to the robot. For example, the exchangeable memory device 14 is a cartridge memory medium such as a memory stick, and is loaded into a predetermined memory slot during use.

Like the fixed memory device 13, the exchangeable memory device 14 is used to store program codes such as an application for controlling the operation and thinking of the robot, and a middleware for the operation of hardware. Since the exchangeable memory device 14, detachably mounted to the robot, is interchangeably used between different types of hardware configurations, the exchangeable memory device 14 is used to supply an up-to-date software program. There is not very high necessity that the hardware dependent software such as the middleware is stored onto the exchangeable memory device 14 in a manner such that the version thereof is set to be compatible with the hardware configuration at the shipment of the robot (default setting) or the standard hardware configuration. It is preferred that the middleware providing the operation environment to the hardware configuration for which the application is intended is combined with the application, and is then stored onto the exchangeable memory device 14.

The drive sub-system 50 includes joint actuators, a drive circuit for each actuator, an encoder for detecting the operation of each actuator, and a variety of sensors such as a camera and a touch sensor (all these not shown here). As shown, the drive sub-system 50 includes drive units such as a head unit, a torso unit, and limb units.

At least some of the drive units are physical components (CPCs or Configurable Physical Components) that can be dynamically reconfigured by mounting, demounting, and interchanging units.

In this embodiment, each physical component is assigned unique identification information, namely, a component ID. The CPU11 of the control sub-system 10 (more specifically, the system control software executed by the CPU11) accesses each installed physical component via a bus, thereby transferring a control command to each physical component, and acquiring each component ID. A combination of the detected ID components becomes current hardware configuration information of the robot.

FIG. 2 illustrates the drive sub-unit 50, the configuration of which is modified by mounting, demounting, and interchanging CPC components. Referring to FIG. 2(*a*), a plurality of physical components such as the torso unit, and the head unit and the tail unit attached to the torso unit, is mounted. Referring to FIG. 2(*b*), a wheel is mounted to the torso unit as a physical component.

As shown in FIGS. 2(*a* and 2(*b*), the same hardware dependent software is not commonly used when the hardware configuration is substantially changed. For example, a middleware for receiving sensor inputs from the head unit and the tail unit cannot operate on the apparatus having the hardware configuration shown in FIG. 2(*b*). Conversely, a middleware designed to drive and control a limb unit as moving means cannot operate on the apparatus having the hardware configuration shown in FIG. 2(*b*).

The software configuration for controlling the robot is discussed below referring to FIG. 3. As shown, the robot control software includes an application layer, a middleware layer, and a system control layer. The design of the software adopts object oriented programming. The object-oriented software is handled according to a module unit called an "object" into which data and the process procedure therefor are integrated. Data communication is performed between the application layer and the middleware layer through a predetermined programming interface (also referred to as an "application interface").

The application includes an emotion model which modelizes the emotion of the robot, an instinct model which modelizes the instinct of the robot, and a behavior model which modelizes a learning module for successively storing the cause and effect relationship between an external event and an action responsive thereto, and a behavior pattern. The application switches an output destination for the action determined by the behavior model determined based on sensor input information, namely, an external factor.

The emotion model and the instinct model respectively receive recognition result and behavior history, and manage an emotion value and an instinct value. The behavior model references these emotion value and instinct value. The learning model updates behavior selection probability based on a learning guide provided from outside (by an operator), and feeds the updated content to the behavior model.

The application performs a computation process using a model which abstracts the configuration and behavior of the robot, and is a hardware independent software not influenced by hardware attributes.

The middleware layer is a set of software modules for providing a basic function of the robot. The construction of each module is a hardware dependent software subject to the effect of the hardware attributes such as electromechanical characteristics, the specifications and the shape of the robot.

The middleware layer is functionally divided into a recognition middleware and an output middleware.

The recognition middleware receives, from the hardware, raw data such as image data, voice data, and other data detected by sensors, through the system control layer, and processes these pieces of data. Based on a variety of pieces of input information, the middleware performs voice recognition, range detection, posture detection, touch sensing, motion detection, and color recognition, thereby acquiring recognition results (for example, detecting a ball, detecting falling, detecting itself being stroked, detecting being beaten, hearing one singing sol-fa, detecting a moving object, detecting an obstacle, recognizing an obstacle, etc.). The recognition results are reported to a hierarchically higher application through the application interface and are used to form a behavior plan.

The output middleware provides functions for walking, reproduction of movement, synthesis of output sound, and controls lighting of an LED corresponding to the eyes. Specifically, the output middleware receives the behavior plan formed in the application layer, generates a servo command value for each joint of the robot per each function of the robot, the output sound, the output light (from the LED), and the output voice, and outputs these pieces of data, namely, performs on the robot through a virtual robot. In this arrangement, the application gives abstract action commands (for example, moving forward, moving backward, being pleased, barking, sleeping, performing bodily exercise, being amazed, tracking), thereby controlling the joint actuators and other output units on the robot body.

In this embodiment, the robot control software is fed to the apparatus 1 by the fixed memory device 13 and the exchangeable memory device 14.

Figure 4:
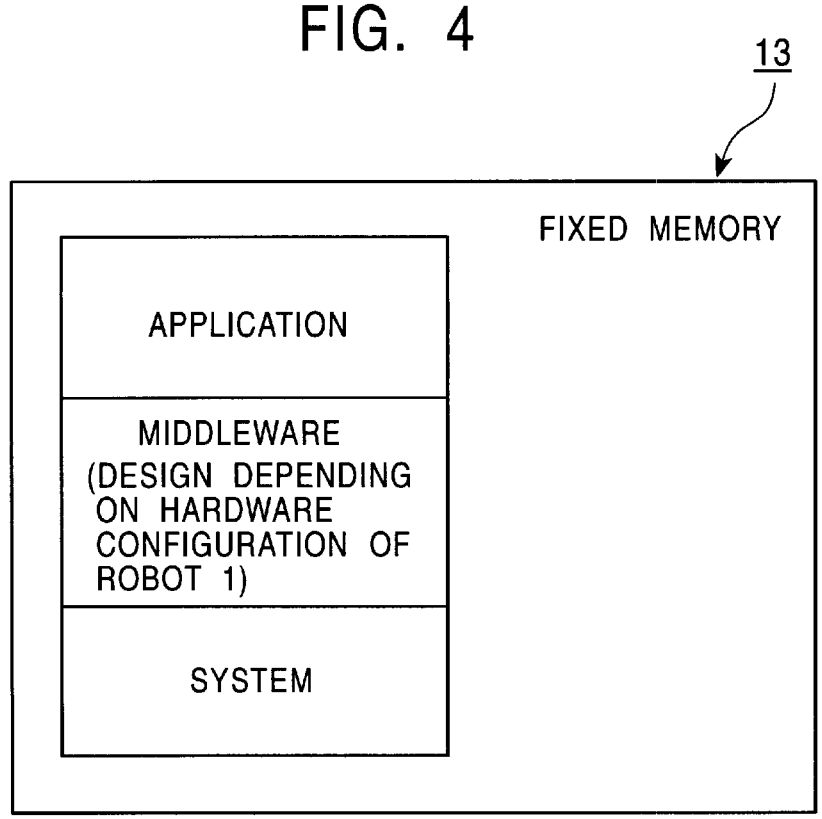
FIG. 4 diagrammatically illustrates the software configuration provided by a fixed memory device 13.

FIG. 4 diagrammatically illustrates the software configuration provided by a fixed memory device 13.

As shown, the fixed memory device 13 includes the application layer, the middleware layer, and the system control layer. The software in each layer is developed on the main memory 12, namely, is mapped in the memory space of the main memory 12.

Since as already discussed, the fixed memory device 13 is permanently fixed to the apparatus, the hardware dependent software such as the middleware is prepared with the version thereof set to be compatible with the hardware configuration at the shipment of the robot (default setting) or the standard hardware configuration.

Figure 5:
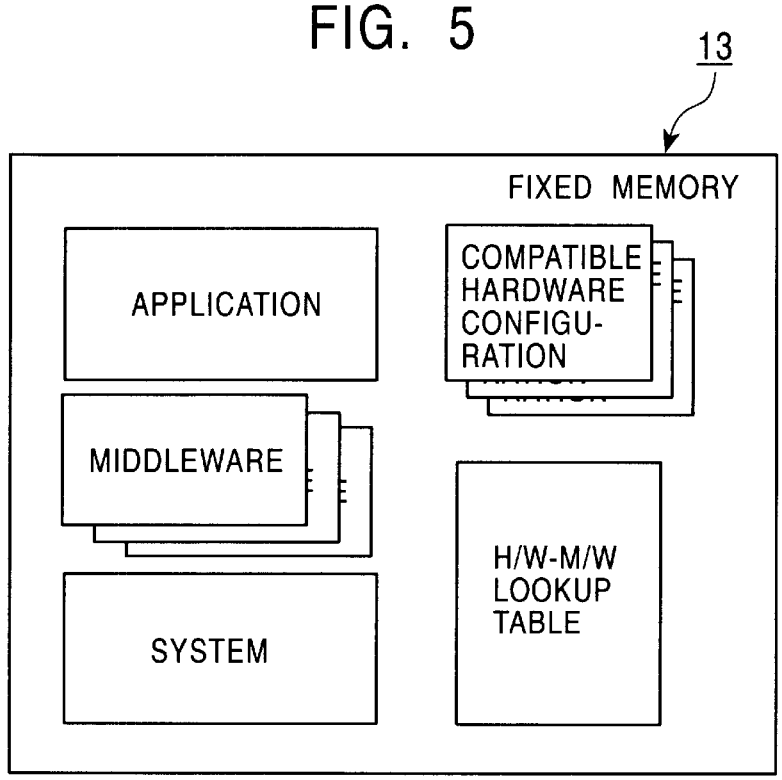
FIG. 5 illustrates a modification of the software configuration provided by the fixed memory device illustrated in FIG. 4.

FIG. 5 illustrates a modification of the software configuration provided by the fixed memory device 13 illustrated in FIG. 4.

In the illustrated example, a plurality of middlewares compatible with different hardware configurations is mounted. In order to immediately determine whether the middleware in the fixed memory device 13 can drive the robot apparatus 1, the fixed memory device 13 includes compatible hardware configuration information which describes the hardware configuration compatible with each middleware. The fixed memory device 13 also includes a lookup table describing the corresponding relationship between the hardware configuration and the middleware corresponding thereto.

The system control layer detects the hardware configuration of the robot, references the compatible hardware configuration information, and hardware-middleware lookup table, and then selectively introduces the middleware compatible with the detected hardware configuration. The introduction process of the middleware will be described in detail later.

Figure 6:
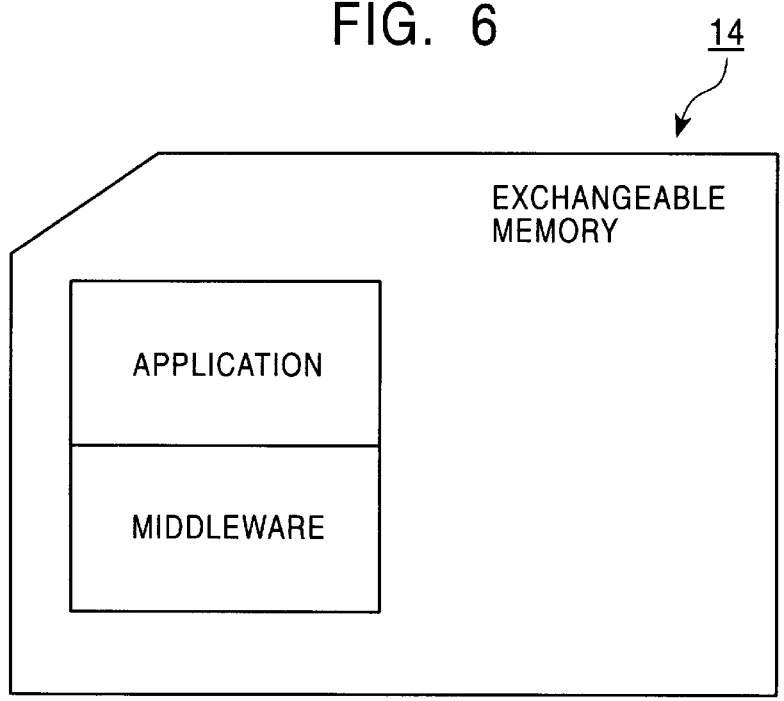
FIG. 6 diagrammatlically illustrates the software configuration provided by an exchangeable memory device 14.

FIG. 6 diagrammatically illustrates the software configuration provided by the exchangeable memory device 14.

As shown, the exchangeable memory device 14 includes an application layer and a middleware layer. The software in each layer is developed, namely, mapped in the memory space of the main memory 12.

The exchangeable memory device 14 is detachably and replaceably mounted to the robot body, and is used interchangeably between apparatuses having different hardware configurations. The main usage of the exchangeable memory device 14 is to dynamically supply the robot with an updated software version or an application the user wants to use, after the shipment of the robot. The middleware in the exchangeable memory device 14 is designed to be intended for the hardware configuration appropriate for the operation of the application.

Depending on the hardware configuration of a target robot in which the exchangeable memory device 14 is loaded, the hardware dependent software such as the middleware is not compatible with the hardware, in other words, cannot be introduced. Since the application layer is hardware independent in principle, it works on the middleware compatible with the hardware configuration of the robot (on the assumption that the compatibility between the application and the middleware is assured).

FIG. 7 illustrates a modification of the software configuration provided by the exchangeable memory device 14 illustrated in FIG. 6.

In the illustrated example, a plurality of middlewares compatible with different hardware configurations is mounted. In order to immediately determine whether the middleware in the exchangeable memory device 14 can drive the robot apparatus 1, the exchangeable memory device 14 includes compatible hardware configuration information which describes the hardware configuration compatible with each middleware. The exchangeable memory device 14 also includes a lookup table describing the corresponding relationship between the hardware configuration and the middleware corresponding thereto.

The system control layer (already discussed) provided by the fixed memory device 13 detects the hardware configuration of the robot, references the compatible hardware configuration information, and hardware-middleware lookup table, and then selectively introduces the middleware compatible with the detected hardware configuration.

As understood from FIG. 4 through FIG. 7, the application is supplied from each of the fixed memory device 13 and the exchangeable memory device 14. The application is independent of the hardware configuration. In principle, the application normally operates on the robot through the middleware compatible with the hardware configuration, regardless of whether it is in the fixed memory device 13 or the exchangeable memory device 14.

In this embodiment, the application and the middleware supplied by the exchangeable memory device 14 are installed with priority. The reason is as follows. An up-to-date software version or a software version the user prefers is selected by transferring the software by means of the exchangeable memory device 14. The design of the middleware on the exchangeable memory device 14 is intended for the hardware configuration of the robot appropriate for the operation of the application.

The system control layer (previously described) provided by the fixed memory device 13 introduces the application and the middleware. Specifically, the system control layer detects the hardware configuration of the robot, references the compatible hardware configuration information and the hardware-middleware lookup table, and then selectively introduces the middleware compatible with the detected hardware configuration. The introduction process procedure of the middleware will be discussed in detail later.

FIG. 8 illustrates operation modes of the robot of this embodiment. As shown, the robot works in three operation modes, i.e., a "best match operation mode", an "intercompatible operation mode", and a "fixed-operation mode".

In the best match operation mode, both the application and the middleware introduced from the exchangeable memory device 14 are used.

In this operation mode, the application dynamically supplied to the robot after the shipment of the robot is used in response to a request from the user. The middleware that is designed in accordance with the operation of the application may be introduced from the exchangeable memory device 14 for use.

In the intercompatible operation mode, the application introduced from the exchangeable memory device 14 is operated on the middleware introduced from the fixed memory device 13.

In this operation mode, the application dynamically supplied to the robot after the shipment of the robot is used in response to the request from the user.

This operation mode is accomplished by furnishing a predetermined programming interface, namely, compatibility between the application of the exchangeable memory device 14 and the middleware of the fixed memory device 13.

In the fixed operation mode, both the application and the middleware are introduced from the fixed memory device 13.

Since an up-to-date software version or a software version satisfying the needs of the user is transferred between the apparatuses, the software introduction is performed from the exchangeable memory device 14 with priority placed thereon. In other words, the robot performs the best match operation mode, the intercompatible operation mode, and the fixed operation in that priority order. The fixed operation mode is performed when the exchangeable memory device 14 is not loaded into the robot.

The process of introducing the software into the robot is discussed below.

FIG. 9 is a flow diagram illustrating the process sequence for introducing the middleware and the application. The system control layer (previously discussed) provided by the fixed memory device 13 performs the introduction process procedure during a boot process of the robot body. The introduction process of the software is discussed below in accordance with the flow diagram.

The system control layer accesses each physical component (CPC) of hardware via the bus, reads the component ID of each component, and acquires the hardware configuration (step S1).

The system control layer attempts to access the exchangeable memory device 14 (step S2).

When the exchangeable memory device 14 is not installed, the middleware and the application are introduced from the fixed memory device 13, are developed on the main memory 12 (steps S10, and S11), and the fixed operation mode is activated.

When the middleware is introduced from the fixed memory device 13 in step S10, the system control layer references the hardware configuration information and the hardware-middleware lookup table in the fixed memory device 13, and selectively introduces the middleware compatible with the hardware configuration detected in step S1, in other words, develops the middleware on the main memory 12.

On the other hand, when exchangeable memory device 14 is installed on the robot body, the system control layer reads the compatible hardware configuration information within the exchangeable memory device 14, compares the compatible hardware configuration information with the hardware configuration of the robot body detected in step S1, and checks compatibility with the middleware (steps S4, and S5).

When no hardware configuration information coinciding with the hardware configuration of the robot body is found in the exchangeable memory device 14, there is no middleware in the exchangeable memory device 14 operable on the robot body. In such a case, the middleware from the fixed memory device 13 is introduced, namely, developed on the main memory 12 (step S8). Also, the application from the exchangeable memory device 14 is introduced, namely, developed on the main memory 12 (step S9), and the intercompatible operation mode is thus activated.

When the middleware is introduced from the fixed memory device 13 in step S8, the system control layer may reference the compatible hardware configuration information and the hardware-middleware lookup table in the fixed memory device 13, and may selectively introduce the middleware compatible with the hardware configuration detected in step S1.

When the hardware configuration information coinciding with the hardware configuration of the actual robot body is found in the exchangeable memory device 14, the system control layer references the hardware-middleware lookup table to check whether a middleware compatible with the hardware configuration of the robot body is present. The middleware is introduced, namely, developed on the main memory 12 (step S6). In succession, the system control layer introduces the application from the exchangeable memory device 14, namely, develops the application on the main memory 12 (step S7), and the best match operation mode is activated.

Figure 10:
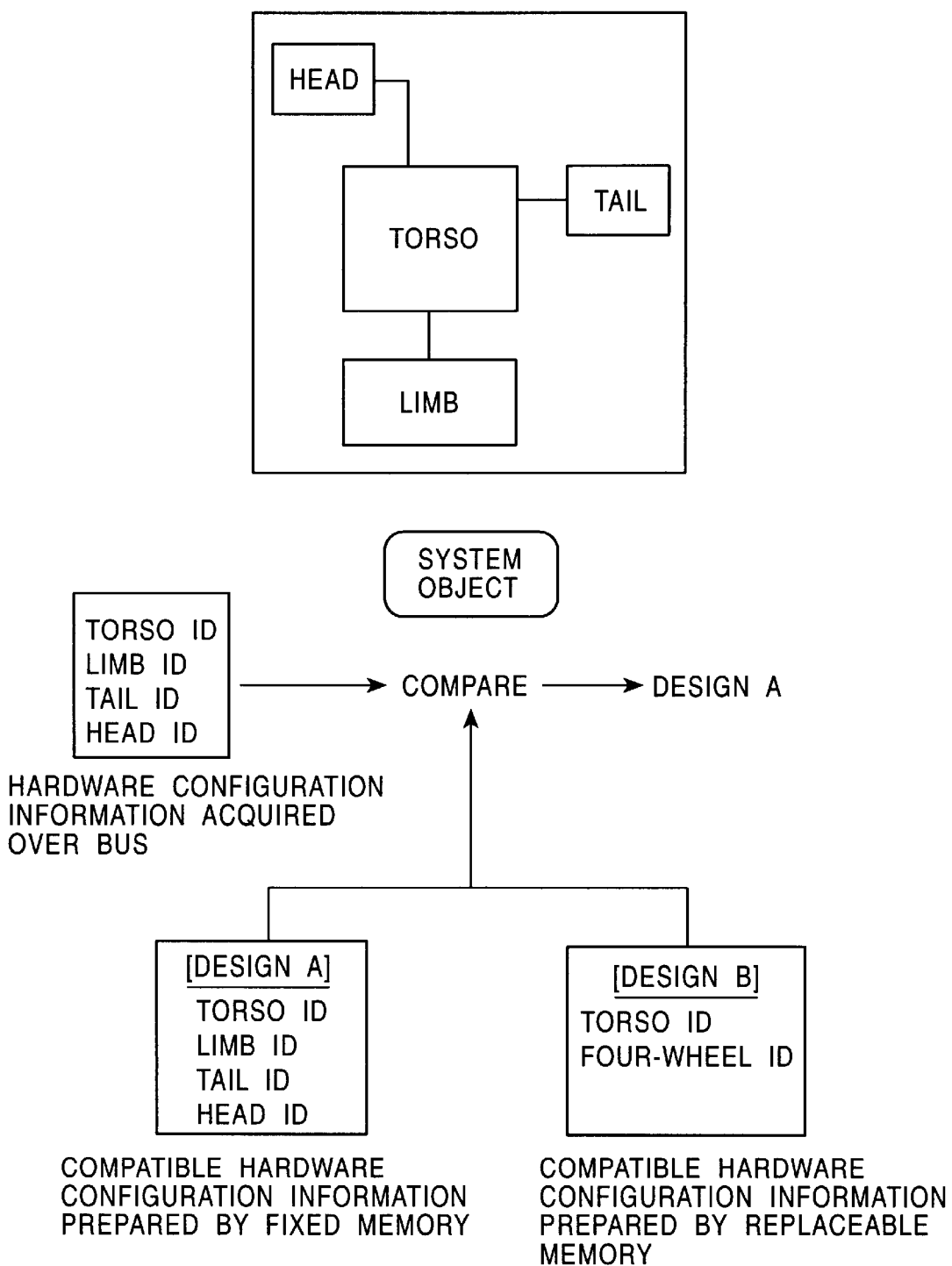
FIG. 10 illustrates a process for acquiring the hardware configuration of an actual robot and for comparing the hardware configuration with compatible hardware configuration information.

FIG. 10 illustrates a process for acquiring the hardware configuration of the actual robot and for comparing the hardware configuration with compatible hardware configuration information. The comparison process of the hardware configuration information is carried out by the system control layer. The system control layer installed through the object-oriented programming is hereinafter referred to as a "system object."

In the illustrated example, the actual robot body includes physical components (CPC), such as a torso unit, limb units, a head unit, and a tail unit. The system object accesses, in hardware, the physical components through the bus, and acquires each component ID. In this case, the hardware configuration of the robot is {torso ID, limb ID, tail ID, and head ID}.

The fixed memory device 13 and the exchangeable memory device 14 respectively have compatible hardware configuration information files called design A and design B. Here, the design A includes the compatible hardware configuration {torso ID, limb ID, tail ID, and head ID}, and the design B includes the compatible hardware configuration {torso ID and four wheel ID}.

The system object compares the hardware configuration information acquired from the actual robot body with each compatible hardware configuration information, and selects the compatible hardware configuration information file compatible with the actual robot apparatus. As shown in the illustrated example, the compatible hardware configuration information file related to the design A is selected.

The system object references the hardware-middleware lookup table in the fixed memory device 13 or the exchangeable memory device 14, searches for the middleware which is determined to be compatible with the robot in hardware configuration, and introduces the middleware and the application.

Figure 11:
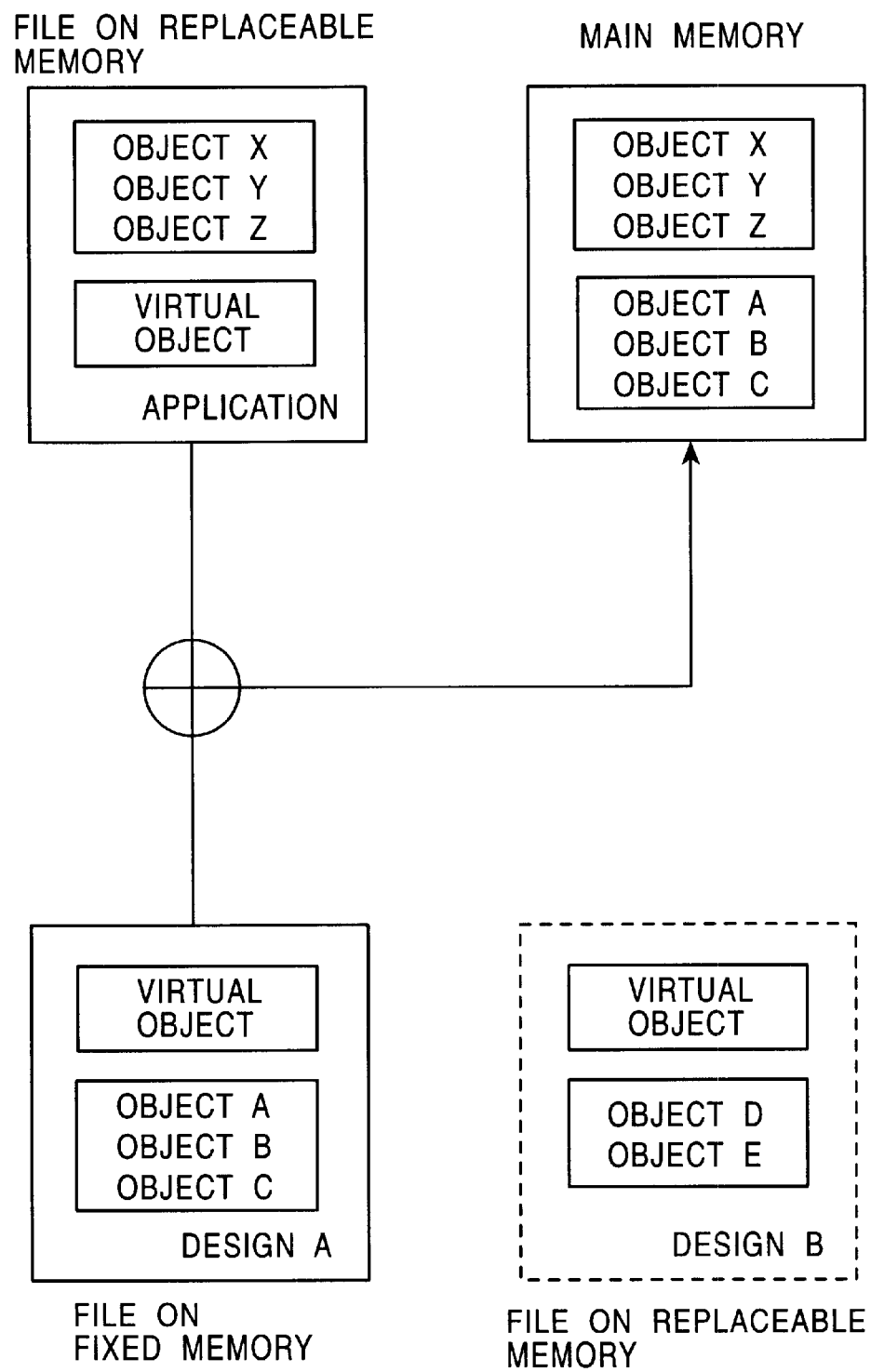
FIG. 11 illustrates a system object which introduces a middleware and an application, namely, develops the middleware and the application in a main memory 12.

FIG. 11 illustrates the system object which introduces the middleware and the application, namely, develops the middleware and the application in the main memory 12.

In this embodiment, the application and the middleware are designed through object-oriented programming.

An application file composed of an object X, an object Y, and an object Z is stored in the exchangeable memory device 14. Each object communicates with the system object through a virtual object.

A middleware file composed of an object A, an object B, and an object C is stored in the fixed memory device 13. Each object communicates with the system object through a virtual object. The middleware is compatible with the hardware configuration information of the above-mentioned design A.

A middleware file composed of an object D and an object E is stored in the exchangeable memory device 14. Each object communicates with the system object through a virtual object. The middleware is compatible with the hardware configuration of the above-mentioned design B.

Now, the system object determines that the hardware configuration information of the actual robot is the design A. In such a case, the system object searches the hardware-middleware lookup table in each of the exchangeable memory device 14 and the fixed memory device 13 for the middleware file compatible with the design A within the fixed memory device 13. Through the virtual object, the object A, the object B, and the object C forming the middleware file are introduced, namely, developed on the main memory 12.

The system object communicates with the object forming the application file in the exchangeable memory device 14 through the virtual object, thereby introducing the object X, the object Y, and the object Z forming the application, namely, developing these objects on the main memory 12.

The introduction of the middleware is performed by substituting an actual object for a portion of the virtual object in the middleware file in the fixed memory device 13, and by loading the resulting file on the main memory 12. The memory loading operation is carried out by the system object.

The interchanging process of the application for driving the robot is discussed below.

As described above, besides the application, the middleware for which the application is intended is stored in the exchangeable memory device 14 such as the memory stick. When the robot apparatus is equipped with the hardware configuration on which the middleware, for which the application is intended, is operable, the middleware is introduced from the exchangeable memory device 14, rather than the middleware in the fixed memory device 13. Otherwise, the application introduced from the exchangeable memory device 14 is operated on the middleware introduced from the fixed memory device 13.

Figure 12:
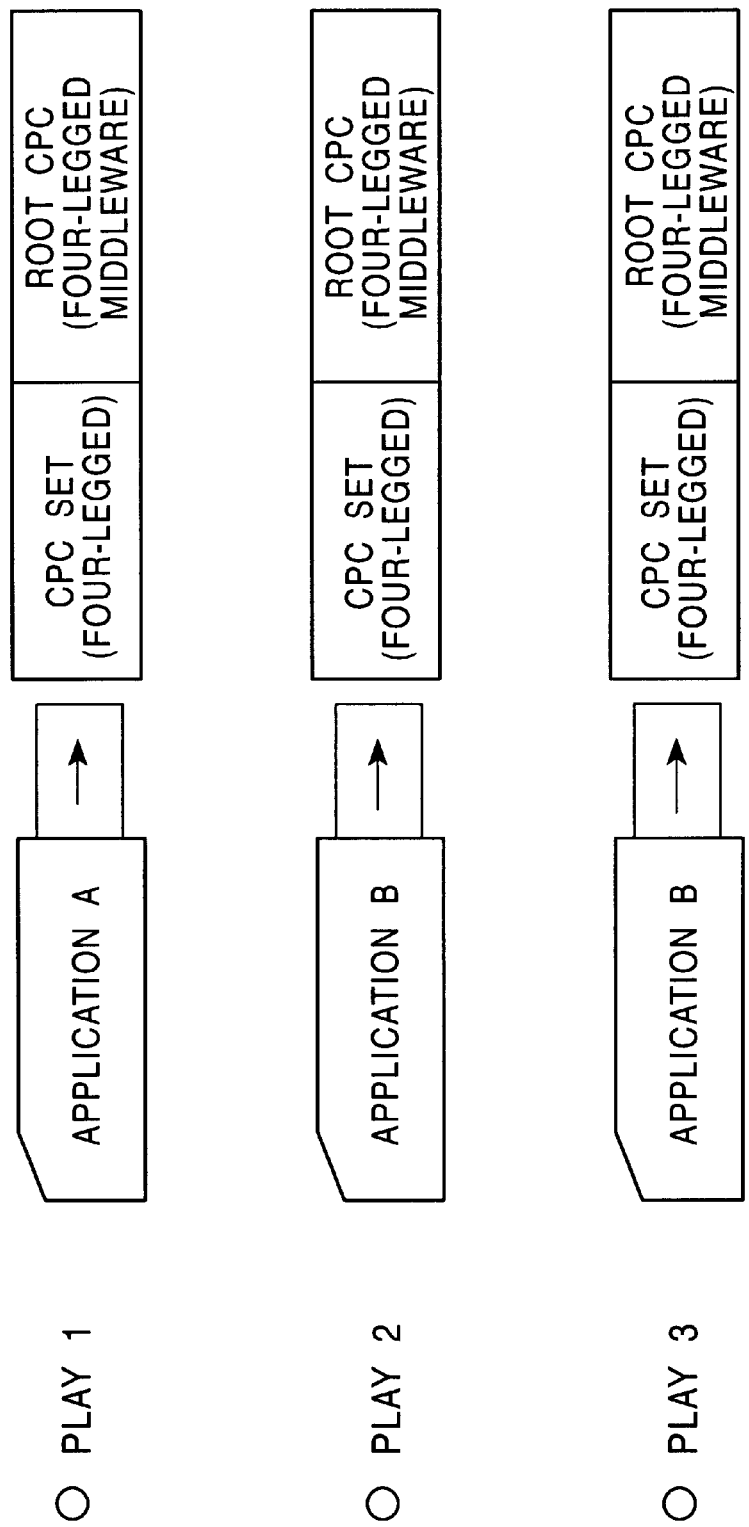
FIG. 12 illustrates the hardware of the robot formed of a plurality of physical components (CPC) which operates based on the application supplied from outside through the exchangeable memory device 14.

FIG. 12 illustrates the hardware of the robot formed of a plurality of physical components (CPC) which operates based on the application supplied from outside through the exchangeable memory device 14.

The robot body includes, for example, physical component (CPC) sets for accomplishing a quadrupedaling action, and four-legged middleware (tentative term) for providing an operation environment for a four-legged CPC set. In this example, the four-legged middleware is introduced from the fixed memory device 13, and is referred to as a "root CPC" middleware closely related to the hardware configuration of the actual robot.

At a play 1 phase, an application A, introduced from the exchangeable memory device 14, drives and controls the four-legged CPC on the root CPC middleware.

At a play 2 phase, an application B, introduced from the exchangeable memory device 14, drives and controls the four-legged CPC set on the root CPC middleware.

At the play 2 phase, the application A, again introduced from the exchangeable memory device 14, drives and controls the four-legged CPC on the root CPC middleware.

The interchanging process of the middleware providing the operation environment of the robot will now be discussed.

At least one of the physical components forming the robot body is detachably and interchangeably mounted, and the CPC set is modified by interchanging the physical component. For example, the four legs as the moving means may be replaced with the four wheels to configure the robot having a four-wheeled CPC set.

As the hardware configuration is dynamically modified in this way, the middleware providing an operation environment needs to be changed from the CPC (the four-legged CPC) middleware to a middleware for four-wheeled CPC set driving. In such a case, like an application program, the new middleware is fed from outside through the exchangeable memory device 14, and then introduced into the main memory 12.

The exchangeable memory device 14 stores, besides the application, the middleware compatible with the hardware configuration for which the application is intended for. When the robot equipped with the exchangeable memory device 14 contains that hardware configuration, the middleware is introduced from the exchangeable memory device 14 and the operation environment is thus provided. Otherwise, the application introduced from the exchangeable memory device 14 is executed under the native operation environment provided by the middleware of the fixed memory device 14.

Figure 13:
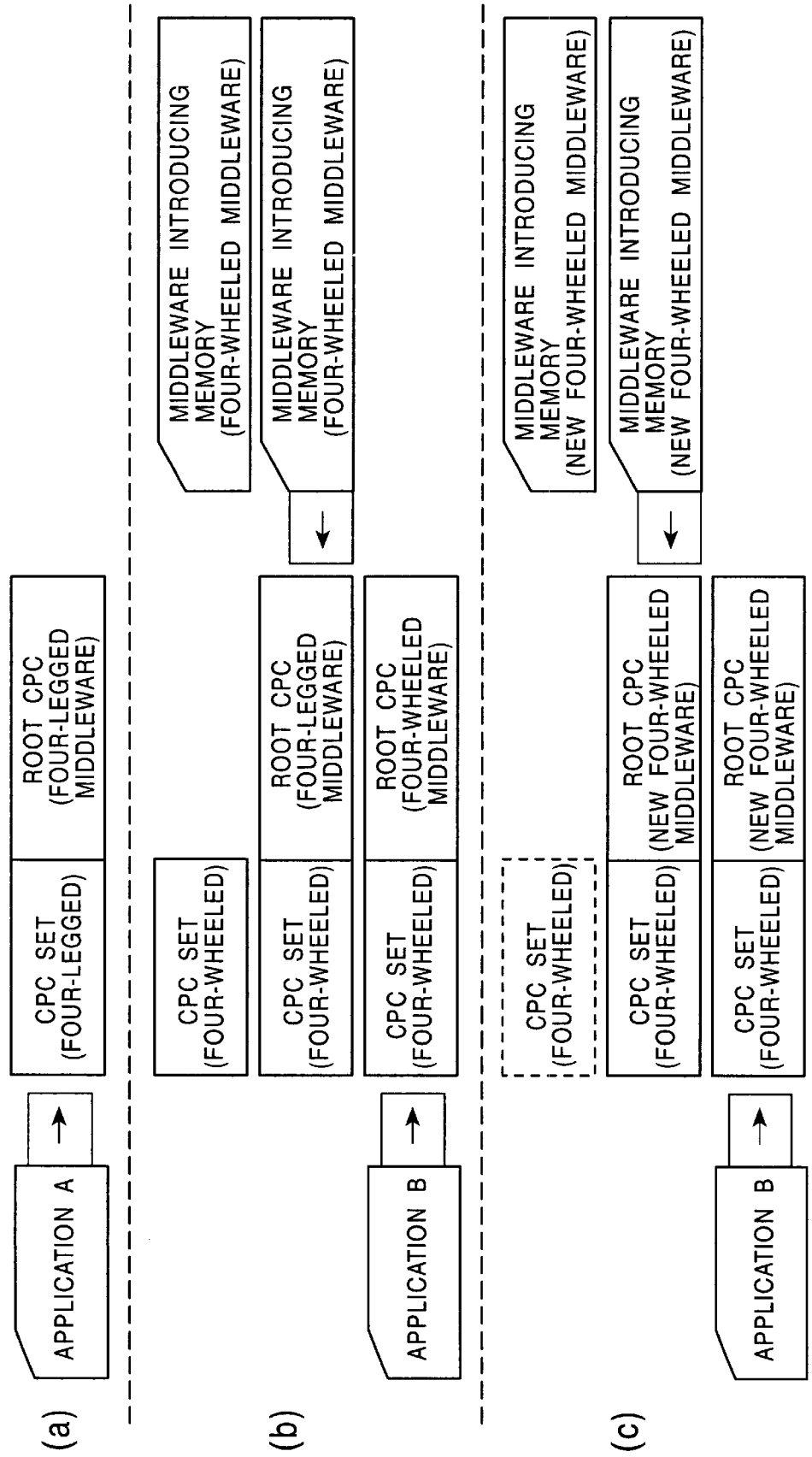
FIG. 13 illustrates the robot formed of a variety of physical component (CPC) sets into which a middleware compatible with the hardware configuration is introduced.

FIG. 13 illustrates the robot formed of a variety of physical component (CPC) sets into which the middleware compatible with the hardware configuration is introduced.

Referring to FIG. 13(a), the robot contains the four-legged CPC set which is a default setting at the shipment thereof. In such a case, the robot is furnished with the operation environment provided by the root CPC middleware introduced from the fixed memory device 13. A variety of applications (the application A in the illustrated example) introduced through the exchangeable memory device 14, which is interchanged by the user, is executed on the root CPC middleware.

Referring to FIG. 13(b), the hardware configuration is modified from the four-legged CPC set to the four-wheeled CPC set through a robot CPC interchanging operation. In such a case, the four-legged root CPC middleware cannot not be used as is. The middleware intended for four-wheeled CPC set driving, namely, the four-wheeled root CPC middleware, is introduced from outside through the exchangeable memory device 14. A variety of applications (the application B in the illustrated example) introduced through the exchangeable memory device 14 is executed under the operation environment provided by the four-wheeled root CPC middleware.

Referring to FIG. 13(c), the hardware configuration of the robot remains unchanged from the four-wheeled CPC set, but the operation environment is modified to a new middleware having a new function of four-wheeled CPC set driving, namely, a new root CPC set for four-wheel driving. The middleware intended for the driving of the new four-wheeled CPC set, namely, the new four-wheeled root CPC middleware is introduced from outside through the exchangeable memory device 14. A variety of applications (the application B in the illustrated example) introduced through the exchangeable memory device 14 is executed under the operation environment provided by the new four-wheeled root CPC middleware.

It should be noted that the same application is executed on robots of a variety of hardware configurations by successively introducing middlewares compatible with the hardware configuration of the actual robot.

This embodiment is based on the assumption that a software layer relatively less dependent on hardware, namely, an application, and a software layer relatively more dependent on hardware, namely, a middleware layer, are independently handled. With the independence of application and client assured, the following functions are performed.

(1) A single application may be compatible with a robot having a variety of hardware configurations. (The user may transfer an application owned (or grown) by the user himself or herself from robot to robot, or may circulate the application for sale.

(2) A middleware compatible with a variety of applications is produced on a robot having a single hardware configuration. Since the middleware has a high reusability, development efficiency of the application increases.

(3) Even with the same application on the robot having the same hardware configuration, actual expressive power and controllability are enhanced by modifying the middleware.

(4) Since binary compatibility is assured, binary codes such as an application or a middleware is downloaded to the robot from the exchangeable memory device 14. The software is thus simply interchanged with the above advantages enjoyed. Without a compile job, software interchanging is performed.

(5) Since the application is independent of the middleware, software development vendors can focus on function development in their specialty field. For example, a vendor developing control systems concentrates on the development of middleware, and uses a variety of applications.

Appendix

The present invention has been detailed referring to particular embodiments. It is however obvious that ordinary skilled artisans easily modify and change the embodiments without departing from the scope of the present invention.

The subject of the present invention is not necessarily limited to products called "robots". The present invention is equally applicable to any machines, which move mimicking the behavior of humans by means of electrical and magnetic effects. For example, the present invention is applicable to products in other industrial fields, such as toys.

The present invention has been disclosed with reference to exemplary embodiments, and should not be understood as limiting the scope of the present invention. In the determination of the scope of the present invention, the preceding claims should be referred to.

INDUSTRIAL APPLICABILITY

The present invention provides an excellent robot control system which controls an articulated robot such as legged walking type using a software program, and provides a method of introducing a robot control software program.

The present invention provides an excellent robot control system which controls, using a software program, an articulated robot which can substantially modify a hardware configuration when an operation unit such as a head unit or a limb unit is mounted, demounted, or interchanged, and provides a method of introducing a robot control software program.

The present invention provides an excellent robot control system which controls an articulated robot using a software program formed of a combination of a software layer largely dependent on a hardware configuration and a software layer independent of the hardware configuration, and provides a method of introducing a robot control software program.

The present invention provides a robot control system which controls the articulated robot by dynamically modifying a combination of a hardware dependent software layer such as a middleware and a hardware independent software layer such as an application, and provides a method of introducing a robot control software.

The present invention, including a memory device for storing a plurality of sets of robot hardware dependent software programs and, a memory device for storing a plurality of sets of robot hardware independent software programs, introduces a software program compatible with a robot hardware configuration from the former memory device at the startup of the robot or during the execution of the software program, and dynamically combining the software program with the software set independent of the hardware configuration. The robot is thus appropriately controlled, thereby satisfying the needs of users.

What is claimed is:

1. A robot control system which controls a robot including a combination of a plurality of hardware elements using a hardware dependent software program and a hardware independent software program, the robot control system comprising:

hardware independent software program providing means for providing the hardware independent software program, hardware dependent software program providing means for providing at least one hardware dependent software program, hardware configuration information acquisition means for acquiring hardware configuration information of the robot, hardware dependent software program selection means for selecting a hardware dependent software program, compatible with the hardware configuration information acquired by the hardware configuration information acquisition means, in the hardware dependent software providing means, and software introduction means for introducing, into the system, the hardware independent software program provided by the hardware independent software program providing means, and the hardware dependent software program selected by the hardware dependent software selection means.

2. A robot control system according to claim 1, further comprising a memory device which is permanently fixed to the body of the robot, wherein the hardware independent software program and/or the hardware dependent software program is provided by the fixed memory device.

3. A robot control system according to claim 1, further comprising a memory device which is replaceably mounted to the body of the robot, wherein the hardware independent software program and/or the hardware dependent software program is provided by the exchangeable memory device.

4. A robot control system according to claim 1, further comprising a memory device which is permanently fixed to the body of the robot, and a memory device which is replaceably mounted to the body of the robot, wherein the hardware independent software program and/or the hardware dependent software program is provided by the fixed memory device and the exchangeable memory device, and wherein the software introduction means introduces the hardware independent software program and/or the hardware dependent software program from the exchangeable memory device with priority placed thereon.

5. A robot control system according to claim 4, wherein the software introduction means introduces the hardware independent software program and/or the hardware dependent software program from the fixed memory device when a usable hardware independent software program and/or a usable hardware dependent software program is not present in the exchangeable memory device or when the exchangeable memory device is not loaded.

6. A robot control software program introducing method for introducing a hardware dependent software program and a hardware independent software program into a robot including a combination of a plurality of hardware configuration elements, the method comprising:

a hardware independent software program providing step for providing the hardware independent software program, a hardware dependent software program providing step for providing at least one hardware dependent software program, a hardware configuration information acquisition step for acquiring hardware configuration information of the robot, a hardware dependent software program selection step for selecting a hardware dependent software program, compatible with the hardware configuration information acquired in the hardware configuration information acquisition step, and provided in the hardware dependent software providing step, and a software introduction step for introducing, into a system, the hardware independent software program provided in the hardware independent software program providing step, and the hardware dependent software program selected in the hardware dependent software selection step.

7. A robot control software program introducing method according to claim 6, wherein the robot comprises a memory device which is permanently fixed to the body of the robot, and wherein the hardware independent software program and/or the hardware dependent software program is provided by the fixed memory device.

8. A robot control software program introducing method according to claim 6, wherein the robot comprises a memory device which is replaceably mounted to the body of the robot, and wherein the hardware independent software program and/or the hardware dependent software program is provided by the exchangeable memory device.

9. A robot control software program introducing method according to claim 8, wherein the robot comprises a memory device which is permanently fixed to the body of the robot, and a memory device which is replaceably mounted to the body of the robot, wherein the hardware independent software program and/or the hardware dependent software program is provided by the fixed memory device and the exchangeable memory device, and wherein the software introducing step introduces the hardware independent software program and/or the hardware dependent software program from the exchangeable memory device with priority placed thereon.

10. A robot control software program introducing method according to claim 9, wherein the software introduction means introduces the hardware independent software program and/or the hardware dependent software program from the exchangeable memory device when a usable hardware independent software program and/or a usable hardware dependent software program is not present in the exchangeable memory device or when the exchangeable memory device is not loaded.

11. A robot control system which controls a robot including a combination of a plurality of hardware elements using a hardware dependent software program and a hardware independent software program, wherein the hardware independent software program and/or the hardware dependent software program is provided by a memory device which is permanently fixed to the body of the robot and a memory device which is replaceably mounted to the body of the robot, wherein the robot control system controls the robot in one of a best match operation mode, an intercompatible operation mode, and a fixed operation mode, and wherein in the best match operation mode, the robot is controlled using the hardware dependent software program and the hardware independent software program introduced from the exchangeable memory device, in the intercompatible operation mode, the robot is controlled using the hardware dependent software program introduced from the fixed memory device and the hardware independent software program introduced from the exchangeable memory device, and in the fixed operation mode, the robot is controlled using the hardware dependent software program and the hardware independent software program introduced from the fixed memory device.

12. A robot control system according to claim 11, wherein one of the best match operation mode, the intercompatible operation mode, and the fixed operation mode is selected.

* * * * *